US009528834B2

United States Patent
Breed et al.

(10) Patent No.: US 9,528,834 B2
(45) Date of Patent: Dec. 27, 2016

(54) MAPPING TECHNIQUES USING PROBE VEHICLES

(71) Applicant: Intelligent Technologies International, Inc., Boonton, NJ (US)

(72) Inventors: David S Breed, Miami Beach, FL (US); Ryan Breed, Laguna Niguel, CA (US)

(73) Assignee: Intelligent Technologies International, Inc., Boonton, NJ (US)

( * ) Notice: Subject to any disclaimer, the term of this patent is extended or adjusted under 35 U.S.C. 154(b) by 0 days.

(21) Appl. No.: 14/570,638

(22) Filed: Dec. 15, 2014

(65) Prior Publication Data

US 2015/0127239 A1 May 7, 2015

Related U.S. Application Data

(63) Continuation-in-part of application No. 14/069,760, filed on Nov. 1, 2013, now Pat. No. 8,914,196.

(51) Int. Cl.
*G01C 21/16* (2006.01)
*G01S 19/13* (2010.01)
(Continued)

(52) U.S. Cl.
CPC ......... *G01C 21/165* (2013.01); *B60R 21/0132* (2013.01); *B60W 30/00* (2013.01);
(Continued)

(58) Field of Classification Search
CPC . G01C 21/165; B60R 21/0132; G06T 7/0042; G06T 2207/10004; G06T 2207/30252; G06T 2207/30244; G01S 19/13; B60W 30/00
(Continued)

(56) References Cited

U.S. PATENT DOCUMENTS 4,388,608 A 6/1983 Bernard
4,819,175 A 4/1989 Wuttke
(Continued)

FOREIGN PATENT DOCUMENTS

DE 10148667 A1 1/2003
WO 2005119290 A1 12/2005

OTHER PUBLICATIONS

Abstract of DE 10148667.
Search Report and Written Opinion for PCT/US2014/70377, Mar. 17, 2015.

*Primary Examiner* — Brian P Sweeney
(74) *Attorney, Agent, or Firm* — Brian Roffe (57) ABSTRACT

Vehicle-mounted device includes an inertial measurement unit (IMU) having at least one accelerometer or gyroscope, a GPS receiver, a camera positioned to obtain unobstructed images of an area exterior of the vehicle and a control system coupled to these components. The control system re-calibrates each accelerometer or gyroscope using signals obtained by the GPS receiver, and derives information about objects in the images obtained by the camera and location of the objects based on data from the IMU and GPS receiver. A communication system communicates the information derived by the control system to a location separate and apart from the vehicle. The control system includes a processor that provides a location of the camera and a direction in which the camera is imaging based on data from the IMU corrected based on data from the GPS receiver, for use in creating the map database.

28 Claims, 2 Drawing Sheets

(51) Int. Cl.
*B60W 30/00* (2006.01)
*G06T 7/00* (2006.01)
*B60R 21/0132* (2006.01)

(52) U.S. Cl.
CPC ............ *G01S 19/13* (2013.01); *G06T 7/0042* (2013.01); *G06T 2207/10004* (2013.01); *G06T 2207/30244* (2013.01); *G06T 2207/30252* (2013.01)

(58) Field of Classification Search
USPC .......................................................... 701/45
See application file for complete search history.

(56) References Cited

U.S. PATENT DOCUMENTS

| | | |
|---|---|---|
| 5,072,396 A | 12/1991 | Fitzpatrick et al. |
| 5,375,059 A | 12/1994 | Kyrtsos et al. |
| 5,485,384 A | 1/1996 | Falconnet |
| 5,657,025 A | 8/1997 | Ebner et al. |
| 5,894,323 A | 4/1999 | Kain et al. |
| 5,999,878 A | 12/1999 | Hanson et al. |
| 6,052,647 A | 4/2000 | Parkinson et al. |
| 6,150,961 A | 11/2000 | Alewine et al. |
| 6,157,891 A | 12/2000 | Lin |
| 6,167,347 A | 12/2000 | Lin |
| 6,246,960 B1 | 6/2001 | Lin |
| 6,278,945 B1 | 8/2001 | Lin |
| 6,292,750 B1 | 9/2001 | Lin |
| 6,311,129 B1 | 10/2001 | Lin |
| 6,385,539 B1 | 5/2002 | Wilson et al. |
| 6,424,914 B1 | 7/2002 | Lin |
| 6,449,559 B2 | 9/2002 | Lin |
| 6,480,789 B2 | 11/2002 | Lin |
| 6,496,778 B1 | 12/2002 | Lin |
| 6,526,352 B1 | 2/2003 | Breed et al. |
| 6,608,913 B1 | 8/2003 | Hinton et al. |
| 6,658,354 B2 | 12/2003 | Lin |
| 6,768,944 B2 | 7/2004 | Breed et al. |
| 6,778,074 B1* | 8/2004 | Cuozzo ................... G01D 7/00 340/441 |
| 6,933,965 B2 | 8/2005 | Heafitz |
| 7,032,858 B2 | 4/2006 | Williams |
| 7,072,764 B2 | 7/2006 | Donath et al. |
| 7,085,637 B2 | 8/2006 | Breed et al. |
| 7,152,347 B2 | 12/2006 | Herzog et al. |
| 7,177,737 B2 | 2/2007 | Karlsson et al. |
| 7,266,445 B1 | 9/2007 | Janky et al. |
| 7,284,769 B2 | 10/2007 | Breed |
| 7,295,925 B2 | 11/2007 | Breed et al. |
| 7,345,699 B2 | 3/2008 | Janssen |
| 7,418,346 B2 | 8/2008 | Breed et al. |
| 7,426,437 B2 | 9/2008 | Breed et al. |
| 7,635,043 B2 | 12/2009 | Breed |
| RE41,175 E | 3/2010 | Vashishth et al. |
| 7,689,321 B2 | 3/2010 | Karlsson |
| 7,693,654 B1 | 4/2010 | Dietsch et al. |
| 7,707,944 B2 | 5/2010 | Bounds |
| 7,832,762 B2 | 11/2010 | Breed |
| 7,840,355 B2 | 11/2010 | Breed et al. |
| 7,899,621 B2 | 3/2011 | Breed et al. |
| 7,912,633 B1 | 3/2011 | Dietsch et al. |
| 7,957,898 B2 | 6/2011 | Hoshizaki et al. |
| 7,962,285 B2 | 6/2011 | Breed |
| 8,000,897 B2 | 8/2011 | Breed et al. |
| 8,010,287 B1 | 8/2011 | Frank et al. |
| 8,019,501 B2 | 9/2011 | Breed |
| 8,024,084 B2 | 9/2011 | Breed |
| 8,036,788 B2 | 10/2011 | Breed |
| 8,060,282 B2 | 11/2011 | Breed |
| 8,068,979 B2 | 11/2011 | Breed |
| 8,200,423 B2 | 6/2012 | Dietsch et al. |
| 8,209,123 B2 | 6/2012 | Miyazaki |
| 8,229,163 B2 | 7/2012 | Coleman et al. |
| 8,229,624 B2 | 7/2012 | Breed |
| 8,265,817 B2 | 9/2012 | Tener et al. |
| 8,422,736 B2 | 4/2013 | Kmiecik et al. |
| 8,452,771 B2 | 5/2013 | Kurciska et al. |
| 8,515,611 B2 | 8/2013 | Tener et al. |
| 8,527,199 B1 | 9/2013 | Brunette et al. |
| 8,593,486 B2 | 11/2013 | Kodaira et al. |
| 8,718,861 B1 | 5/2014 | Montemerlo et al. |
| 8,725,412 B2 | 5/2014 | Kabori et al. |
| 8,725,413 B2 | 5/2014 | Kozak et al. |
| 8,860,944 B2 | 10/2014 | Retterath et al. |
| 8,868,335 B2 | 10/2014 | Nowak et al. |
| 8,893,026 B2 | 11/2014 | Lindemann et al. |
| 8,954,217 B1 | 2/2015 | Montemerlo et al. |
| 9,008,998 B2 | 4/2015 | Canter |
| 9,043,072 B1 | 5/2015 | Tisdale et al. |
| 9,062,979 B1 | 6/2015 | Ferguson et al. |
| 9,140,792 B2 | 9/2015 | Zeng |
| 9,156,473 B2 | 10/2015 | Clarke et al. |
| 9,322,660 B2 | 4/2016 | Mund |
| 9,341,488 B2 | 5/2016 | Mund et al. |
| 2003/0176970 A1 | 9/2003 | Lin |
| 2005/0182518 A1 | 8/2005 | Karlsson |
| 2005/0234679 A1 | 10/2005 | Karlsson |
| 2006/0106533 A1 | 5/2006 | Hirokawa |
| 2006/0139619 A1 | 6/2006 | Fujii et al. |
| 2006/0233424 A1 | 10/2006 | Miyajima et al. |
| 2006/0287824 A1 | 12/2006 | Lin |
| 2009/0005961 A1 | 1/2009 | Grabowski et al. |
| 2009/0087029 A1 | 4/2009 | Coleman et al. |
| 2009/0254279 A1* | 10/2009 | Han ..................... G01C 21/16 701/501 |
| 2010/0010741 A1 | 1/2010 | Tener et al. |
| 2011/0208745 A1 | 8/2011 | Dietsch et al. |
| 2011/0282622 A1 | 11/2011 | Canter |
| 2012/0078510 A1* | 3/2012 | Ma ..................... G01C 21/165 701/426 |
| 2012/0121161 A1 | 5/2012 | Eade et al. |
| 2012/0290146 A1* | 11/2012 | Dedes ................... G08G 1/163 701/1 |
| 2012/0320195 A1 | 12/2012 | Tener et al. |
| 2013/0018575 A1 | 1/2013 | Birken et al. |
| 2013/0173115 A1 | 7/2013 | Gunia et al. |
| 2014/0005932 A1 | 1/2014 | Kozak et al. |
| 2014/0129088 A1 | 5/2014 | Meissner et al. |
| 2015/0025788 A1 | 1/2015 | Crain et al. |

\* cited by examiner

MAPPING TECHNIQUES USING PROBE VEHICLES

CROSS REFERENCE TO RELATED APPLICATIONS

This application is a continuation-in-part of U.S. patent application Ser. No. 14/069,760 filed Nov. 1, 2013, now U.S. Pat. No. 8,914,196.

FIELD OF THE INVENTION

The present invention relates generally to arrangements and methods for mapping terrain including roads using probe vehicles traveling on the roads, wherein each vehicle contains one or more cameras with GPS-corrected IMUs.

BACKGROUND OF THE INVENTION

A detailed discussion of background information is set forth in U.S. patent application Ser. Nos. 14/069,760 and 13/686,862 which is incorporated by reference herein.

Electronic crash sensors used to sense crashes for airbag deployment currently in production comprise one or more MEMS accelerometers that measure acceleration at the sensor location. These accelerometers are typically produced by micromachining a single crystal of silicon and the sensing elements are frequently in the form of a beam or tuning fork. The silicon crystal typically has residual stresses that can cause the mechanical structure of the accelerometer to change geometrically as a function of time and/or temperature unpredictably. As a result, properties of the accelerometer similarly can change with time and temperature. To overcome this inherent problem, additional apparatus is designed into the accelerometer to permit the acceleration sensing beam or tuning fork to be excited and its response tested. These accelerometers are continuously self-tested and adjusted as their properties change to maintain proper calibration. This adds cost and complexity to the accelerometer and sensor software design. This self-testing feature also increasingly complicates the device design if more than one axis is simultaneously tested.

Accelerometers are also used in vehicle navigation systems such as on some state snow plows for accurately locating the vehicle on a snow covered roadway. However, rather than calibrating each inertial device by using GPS, they are inherently accurate devices which are calibrated in a laboratory. They are used to interpolate vehicle positions between GPS readings. Such devices are not used to determine the angular position of cameras.

All of the patents, patent applications, technical papers and other references mentioned herein and in the related applications are incorporated by reference herein in their entirety. No admission is made that any or all of these references are prior art and indeed, it is contemplated that they may not be available as prior art.

Definitions of terms used in the specification and claims are also found in the above-mentioned applications.

SUMMARY OF THE INVENTION

In order to achieve a new and improved method and arrangement for creating maps of terrain surrounding and/or including roads, a method and system for mapping terrain including one or more roads in accordance with the invention includes a vehicle equipped with at least one camera, a position determining system that determines its position and an inertial measurement unit (IMU) that provides, when corrected by readings from the position determining system, the position and angular orientation of the camera(s) and IMU, all of which are in a set configuration relative to one another. A processor at a remote location apart from the vehicle receives data from the vehicle and converts information related to fiduciaries from the images from the camera(s) to a map including objects from the images by identifying common objects in multiple images, which may be obtained from the same or different vehicles, and using the position information and the inertial measurement information from when the multiple images were obtained and knowledge of the set configuration of the camera(s), the position determining system and the IMU. The information derived from the images, position information and inertial measurement information are transmitted to the processor by a communications unit on the vehicle. The position determining unit, the IMU, the camera and the communications unit may be combined into a single device for easy retrofit application to one or more vehicles.

In the present invention, inexpensive inertial MEMS devices are used but are calibrated frequently using GPS and rather than self-testing the accelerometer, the integrated output of the accelerometer is compared with GPS location and angular orientation of the vehicle and the discrepancy is used to modify acceleration values, for accelerometers, and angular velocities for gyroscopes, and this data is used to determine position and/or angular orientation of the vehicle. As used herein, a "GPS" means a global positioning system device, unit or component that is capable of determining its position by communicating with satellites. For some embodiments, the angular orientation is important because it determines the direction that the imager is pointed when pictures are acquired which is an important parameter in determining the location of an object in space which appears in an image. In contrast to single or dual accelerometer vehicle crash sensors, additional accelerometers and gyroscopes are used in the device and the additional complexity due to the requirement to self-test each accelerometer or gyroscope is no longer necessary. In fact, the Kalman filter and/or neural network technologies not only permit calculations to be corrected for each accelerometer and gyroscope but also consider effects that errors in one accelerometer or gyroscope, such as due to alignment errors, may have on readings of another accelerometer or gyroscope and also eliminates those errors.

Expensive navigation systems sometimes use an inertial measurement unit (IMU). Such a unit consists of three accelerometers and three gyroscopes permitting both angular motion and linear displacements of the device to be measured. Through a Kalman filter and/or neural network, the GPS-determined positions can be used to correct the angular and displacement positions of the device. When an IMU is used in an inventive mapping system, the GPS can yield corrections to the individual measurements of the inertial devices rather than to their integrals for angular motions and to velocities or accelerations for accelerometers.

These individual readings are directed to vehicle angular and displacement determination algorithms, incorporated or executed by a processor such as, for example, a computer, to be used to determine location and orientation of the vehicle. By eliminating self-testing requirements, the IMU becomes inexpensive to manufacture as compared to a comparable device where self-testing has been implemented. This method of error correction particularly corrects for errors in alignment of accelerometers and gyroscopes with the vehicle coordinate system which is a significant source of errors that cannot be eliminated through self-testing.

The IMU can be designed using three accelerometers and three gyroscopes as in the conventional IMU or, alternatively, six accelerometers can be used. There are advantages and disadvantages to each design and both have been discussed in the '196 patent and will not be repeated here. Both designs may be used in the instant invention.

Changes to the mechanical properties of the MEMS devices due to aging and temperature generally act slowly. Properties of the inertial devices, therefore, do not change rapidly and thus if the vehicle enters a zone of poor GPS reception, there is little loss in accuracy of the inertial devices until GPS reception is restored even if this takes several minutes. This method of correction of the inertial devices is believed to be considerably more accurate than standard self-test methods used by conventional airbag crash sensors, for example. Additionally, since changes in the atmospheric disturbances of the GPS signals also occur slowly, differential corrections are not required to be vehicle-resident, similarly simplifying the system design. Although there may be significant errors in actual displacements due to such effects, change in these displacements from one instance of GPS reception to another later instance of GPS reception, separate by a period of lack of GPS reception, are quite accurate.

To use GPS to correct the IMU accelerometers and gyroscopes, accurate absolute positioning is not required to be done on the vehicle, since it is the change in position as measured by the GPS, using a common satellite set, and IMU that are compared. Thus, differential corrections are not needed. They can be applied at a remote location where the map creation is performed since the remote location can know the wide area differential corrections to apply if it knows the time the GPS signals were received and the approximate location of the receiving vehicle and preferably if it also knows the particular satellites which were used to make the location calculation. Later application of differential corrections can reduce the GPS errors to below 10 centimeters (1 sigma).

Although various numbers of inertial devices can be effectively used with this invention, at significantly less than $1 per accelerometer or gyroscope, little cost penalty is incurred by using more rather than fewer devices. The computational complexity is minimal since computations do not need to be carried out frequently and a common microprocessor or processor can be used for both GPS and inertial device computations. In some implementations, additional devices such as a temperature sensor or additional accelerometers tuned to different sensitivity ranges can be added in order to improve capabilities of the system and also render the device useful for other applications, such as general navigation, crash sensing and electronic stability control. Accelerometers are now available where the range is dynamically settable so that the same accelerometer can be used at one time for navigation and at another time for crash sensing. Various versions of the Kalman filter and/or neural network can be used to couple the GPS and IMU systems together, as discussed below. In some embodiments, a trained neural network is optionally used to supplement a Kalman filter, rather than as a substitute therefor.

Generally, a GPS employs a single receiving antenna. In such an implementation, the location of a point coincident with the antenna can be calculated. To determine the angular orientation of the vehicle from GPS readings, additional antennas can be used at little additional cost. A combination of three antennas, for example, provides angular orientation information as well as position information. Multiple antennas also give the opportunity of providing some correction of multipath effects as is known by those skilled in the art, and for more accurate angular motion determination.

In a preferred implementation, the power requirements of the system are sufficiently low that significant drain on the vehicle battery is avoided. Thus, in a preferred implementation of the invention, the GPS and IMU system is always on. If the vehicle is not moving for a significant time period, the devices can be placed in a sleep mode and awakened on any significant motion.

Other sensors including a magnetometer or an odometer can be incorporated into the system to improve the system performance and some of these have been discussed in the '196 patent and is not repeated here. This invention also contemplates a continuous improvement process whereby the system resident software can be updated wirelessly from the Internet, for example, as additional information regarding mapped objects or better algorithms are obtained.

Although GPS is used in this specification, it is to be understood that any navigational GNSS satellites can be used including Glonass, Galileo and others either singularly or in combination with GPS. Generally, such systems are referred to herein as a satellite-based positioning system.

Other improvements are now obvious to those skilled in the art. The above features are meant to be illustrative and not definitive.

One preferred embodiment of the inventions are shown in the drawing and described in the detailed description below. Unless specifically noted, it is applicants' intention that the words and phrases in the specification and claims be given the ordinary and accustomed meaning to those of ordinary skill in the applicable art(s). If applicants intend any other meaning, they will specifically state they are applying a special meaning to a word or phrase. In this regard, the words velocity and acceleration are considered vectors unless stated otherwise. Speed, on the other hand, is treated as a scalar. Velocity implies both speed and direction.

Likewise, applicants' use of the word "function" in the detailed description is not intended to indicate that they seek to invoke the special provisions of 35 U.S.C. §112, ¶6 to define their inventions. To the contrary, if applicants wish to invoke the provision of 35 U.S.C. §112, ¶6, to define their inventions, they will specifically set forth in the claims the phrases "means for" or "step for" and a function, without also reciting in that phrase any structure, material or act in support of the function. Moreover, even if applicants invoke the provisions of 35 U.S.C. §112, ¶6, to define their inventions it is applicants' intention that their inventions not be limited to the specific structure, material or acts that are described in preferred embodiments. Rather, if applicants claim their inventions by specifically invoking the provisions of 35 U.S.C. §112, ¶6, it is nonetheless their intention to cover and include any and all structures, materials or acts that perform the claimed function, along with any and all known or later developed equivalent structures, materials or acts for performing the claimed function.

For example, the present inventions make use of GPS satellite location technology, and can also employ the use of other technologies such as MIR or RFID triads or radar and reflectors, and laser range meters, to derive the location and orientation of the vehicle for use in a system for obtaining images for later processing to create maps, as described in the related patents. The inventions described herein are not to be limited to the specific GPS devices disclosed in preferred embodiments, but rather, are intended to be used with any and all such applicable satellite and infrastructure location devices, systems and methods, as long as such devices, systems and methods generate input signals that can be analyzed by a computer to accurately quantify vehicle location and orientation parameters in real time. Thus, the GPS and related devices and methods shown and referenced generally throughout this disclosure, unless specifically noted, are intended to represent any and all devices appropriate to determine such location and orientation parameters.

Further, there are disclosed several processors or controllers that perform various control operations. The specific form of processor is not important to the invention. In its preferred form, the computing and analysis operations are divided into several cooperating computers or microprocessors. However, with appropriate programming well known to those of ordinary skill in the art, the inventions can be implemented using a single computer. Thus, it is not applicants' intention to limit their invention to any particular form or location of processor or computer. For example, it is contemplated that in some cases, a processor may reside on a network connected to the vehicle such as one connected to the Internet.

Further examples exist throughout the disclosure, and it is not applicants' intention to exclude from the scope of their inventions the use of structures, materials, or acts that are not expressly identified in the specification, but nonetheless are capable of performing a claimed function.

The above and other objects and advantages of the present invention are achieved by preferred embodiments that are summarized and described below.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

DETAILED DESCRIPTION OF THE PREFERRED EMBODIMENTS

An object of the present invention is to provide a mapping system for probe vehicles. To do this, basic engineering solutions for a GPS-corrected IMU angular and displacement location system primarily for mass produced cars are presented. This objective is accomplished by:

1) Using a device containing a camera, a GPS or equivalent receiver, communication apparatus, IMU, and an ECU, comprising an electronic control system with the inertial measurement unit (IMU) mounted together at an appropriate location for imaging an area external to the vehicle.

2) Manufacturing IMUs in accordance with the mass-production MEMS technology at a cost of a few dollars per unit. An IMU can comprise 3 accelerometers and 3 gyroscopes or more generally, a plurality of accelerometers and/or a plurality of gyroscopes. Sometimes, it also comprises a 3 axis magnetometer.

3) Replacing the expensive, currently in-use self-calibration system for the correction of the changing errors in the sensor parameters and applying a procedure for re-calibration of IMU gyroscopes and accelerometers with the help of GPS signals. The cost of a GPS sensor is also a few dollars per unit.

4) Additionally, optionally using the zero lateral and vertical speed of the vehicle, as well as speedometer and odometer readings for IMU calibration.

5) Additionally, optionally correcting the projections of gravitational acceleration in accelerometer readings, when the vehicle tilts, and centrifugal accelerations during turning maneuvers.

Preferred specifications for an IMU exemplifying, non-limiting system for use in generating maps using probe vehicles in accordance with one embodiment of the invention are as follows:

1) An allowable accelerometer measurement error is assumed to be about 5% or about 0.075 g.

2) A maximum longitudinal slope of a highway and city (V<100 km/hour) road is about 5% (2.86 degrees), which corresponds to a horizontal projection of acceleration of about 0.05 g. The cross slope of a road is about 2.5% (1.43 degrees) corresponds to a horizontal projection of acceleration of about 0.025 g.

3) Expected values for additional sources of the vehicle tilt with respect to the horizontal plane are as follows:
oscillations are < about 5 degrees;
uneven tire pressure is < about 1 degrees;
non-uniform load is < about 2 degrees;
uneven rigidity of shock absorbers is < about 1 degree;
a manufacturing error in the accelerometer sensitivity axis orientation with respect to the car horizontal axis is < about 1 degrees.

Considering that road slopes and vehicle tilts have random independent values, the average maximum slope of the accelerometer axis of sensitivity with respect to a horizon plane can be obtained as:

$$Aa=(2.86^2+5^2+1^2+2^2+1^2+1^2)^{1/2}=6.4 \text{ degrees.}$$

The projection of the vertical acceleration onto the accelerometer axis of sensitivity due to the longitudinal slope is Ah=g sin 6.4°=0.11 g, which is equivalent to the half of the allowable error in the measurement, even without considering the accelerometer errors.

Figure 1:
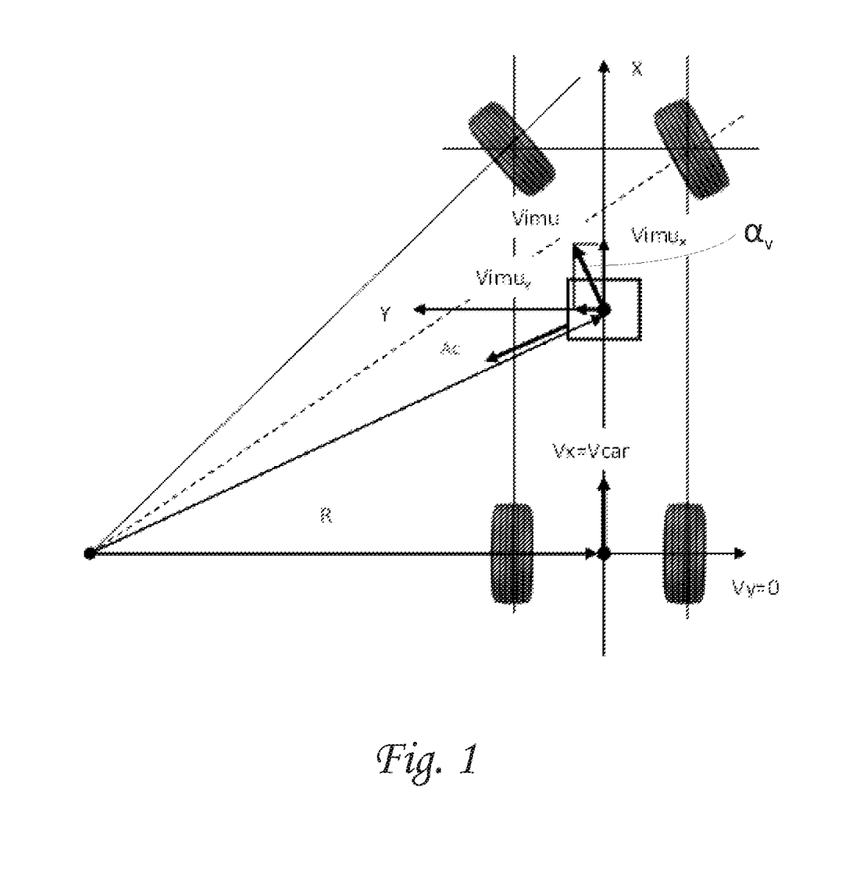
FIG. 1 is a diagram showing various vehicle and IMU velocities.

4) A speed vector deviation from a longitudinal axis of the vehicle during a turning maneuver (FIG. 1) is of the order of $\alpha_v$=about 1 degree (V=30 MPH, the lateral acceleration is about 0.1 g, the turning radius is about 180 M, the vehicle axle spacing is about 4 M, the sensor is mounted at a distance of about 1 m from the front axle).

The IMU, GPS receiver, camera, ECU and communications apparatus can be mounted in a single small device similar to an android smartphone and mounted at a convenient location on the probe vehicle where the camera has a clear view of a portion of the environment surrounding the probe vehicle. Preferably this view captures a portion of the road in front of the vehicle and the terrain at least partially to both sides of the vehicle. Preferred mounting locations include on the front grill or fender above a headlight, on the roof either centrally located or on the side or any other location providing a clear view of the road ahead of the vehicle and the terrain on both sides of the vehicle. To accomplish this, the camera can have a horizontal field of view of from about 45 to about 180 degrees although smaller fields of view are also workable.

Figure 2:
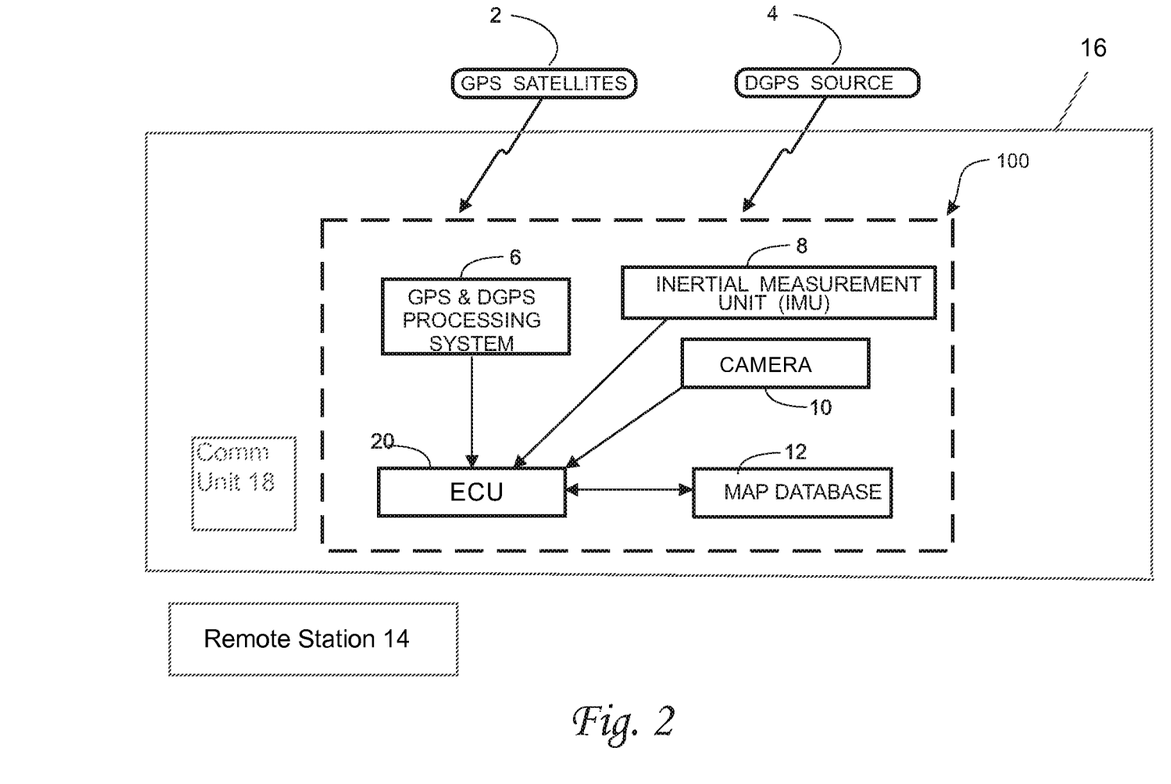
FIG. 2 is a logic diagram showing the combination of the GPS system, camera and an inertial measurement unit.

FIG. 2 illustrates a self-contained unit, 100, having a housing which can be retrofitted onto a large number of probe vehicles. The GPS satellite constellation is illustrated at 2. Optionally a source of DGPS corrections is illustrated at 4. The self-contained unit, which can appear similar to a smart phone, is illustrated generally at 100 on a probe vehicle 16 and comprises a GPS and optionally DGPS processing system 6, an inertial measurement unit 8, a camera 10, a map database 12, and an ECU 20. Initially, these units 100 can be retrofitted onto a fleet of possibly government-owned vehicles to initiate the map creation process. Afterwards, they can be retrofitted onto any number of public and privately owned vehicles. It is expected that the self-contained unit will be about the size of and cost significantly less than a smartphone.

When an image is acquired by camera 10, it can be subjected to a coding process and coded data entered into a pattern recognition algorithm such as a neural network in the ECU 20. In one preferred implementation, the pixels of each image from camera 10 are arranged into a vector and the pixels are scanned to locate edges of objects. When an edge is found by processing hardware and/or software in the ECU 20, the value of the data element in the vector which corresponds to the pixel can be set to indicate the angular orientation of the edge in the pixel. For example, a vertical edge can be assigned a 1 and a horizontal element an 8 and those at in between angles assigned numbers between 1 and 8 depending on the angle. If no edge is found, then the pixel data can be assigned a value of 0. When this vector is entered into a properly trained neural network, the network algorithm can output data indicating that a pole, tree, building, or other desired to-be-recognized object has been identified and provide the pixel locations of the object. This can be accomplished with high accuracy providing the neural network has been properly trained with sufficient examples of the objects sought to be identified. Development of the neural network is known to those skilled in the art with the understanding as found by the inventors that a large number of vectors may be needed to make up the training database for the neural network. In some cases, the number of vectors in the training database can approach or exceed one million. Only those objects which are clearly recognizable are chosen as fiduciaries.

Once pixels which represent a pole, for example, have been identified, then one or more vectors can be derived extending from the camera in the direction of the pole based on the location and angle of the camera 10. When the pole is identified in two such images (from the same or different cameras 10) then the intersection of the vectors can be calculated and the pole location in space determined.

The above described neural network is based on using the edges of objects to form the vectors analyzed by the neural network in the ECU 20. This is only one of a large number of such techniques where observed object properties exhibited in the pixels are used to form the neural network vectors. Others include color, texture, material properties, reflective properties etc. and this invention should not be limited to a particular method of forming the neural network vectors or the pixel properties chosen.

The neural network can be implemented as an algorithm on a general-purpose microprocessor or on a dedicated parallel processing DSP, neural network ASIC or other dedicated parallel or serial processor, part of the ECU 20 or independent therefrom. The processing speed is generally considerably faster when parallel processors are used. Other optical methods exist for identifying objects using a garnet crystal, for example, to form the Fourier transform of an image. This is discussed in U.S. Pat. No. 7,840,355.

It is important to note that future GPS and Galileo satellite systems plan for the transmission of multiple frequencies for civilian use. As with a lens, the ionosphere diffracts different frequencies by different amounts (as in a rainbow) and thus the time of arrival of a particular frequency depends on the value of that frequency. This fact can be used to determine the amount that each frequency is diffracted and thus the delay or error introduced by the ionosphere. Thus, with more than one frequency being emitted by a particular satellite, the approximate equivalent of the DGPS corrections can be determined be each receiver and there is no longer a need for DGPS, WADGPS, WAAS, LAAS and similar systems.

All information regarding the road, both temporary and permanent, should be part of the map database 12, including speed limits, presence and character of guard rails, width of each lane, width of the highway, width of the shoulder, character of the land beyond the roadway, existence of poles or trees and other roadside objects, exactly where chosen fiduciaries are located, the location and content of traffic control signs, the location of variable traffic control devices, etc. The speed limit associated with particular locations on the maps should be coded in such a way that the speed limit can depend upon, for example, factor such as the time of day and/or the weather conditions.

Speed of travel of a probe vehicle 16 depends to some extent on the accuracy desired for the image and thus on the illumination present and the properties of the imager. In some cases where the roadway is straight, the probe vehicle 16 can travel at moderate speed while obtaining the boundary and lane location information, for example. However, where there are multiple fiduciaries in an image, the rate at which images are acquired and processed may place a limit on the speed of the probe vehicle 16. Of course where there is an intense number of fiduciaries, the images can be stored and processed later.

In this regard, a display may be provided to the driver of the probe vehicle 16 indicating the maximum speed which is determined based on the number of fiduciaries in the images being obtained by the camera 10 on the probe vehicle 16. If the probe vehicle 16 is autonomous, then its speed may be limited by known control systems the number of fiduciaries in the images being obtained by camera 10. In the same manner, the highest speed of the probe vehicle 16 may be notified to the driver or limited by control systems based on the accuracy desired for the images obtained by the camera 10, i.e., on the illumination present and the properties of the imager, as a sort of feedback technique. Data about the time and accuracy of the processing of images from the camera 10 by the ECU 20 is thus used to control a driver display (not shown) to show the highest speed or to control the autonomous vehicle speed control system.

Multiple image acquisition systems can be placed on a probe vehicle 16 when it is desired to acquire images for mapping purposes of more than one view from the vehicle 16. One might be placed looking forward and to the right and another looking forward and to the left, for example. This is especially useful for cases when the lanes are separated by a median or for one-way streets. Alternately, a single device with a wide horizontal field of view can suffice. An alternate solution is to place multiple imagers on one device to preserve a large number of pixels but also cover a large field of view. With a large number of probe vehicles, some can be set up to observe the front and right side of the vehicle and others to observe the front and left side. Special distorting lenses can also be designed which permit more efficient use of available pixels by increasing the horizontal field of view at the expense of the vertical.

Other devices can be incorporated into the system design such as a receiver 4 for obtaining DGPS corrections on the vehicle, although this is not essential for inventive mapping methods since the corrections can be made at the remote map processing station. The inventive mapping system also works without using DGPS corrections, although the convergence to any desired accuracy level requires more images. In one implementation, DGPS corrections can be obtained from an Internet connection which can be through a Wi-Fi connection or through the cell phone system or by communication from a satellite arranged for that purpose. Each camera can also have one or more associated laser pointers, or equivalent, that preferably operates in the near IR portion of the electromagnetic spectrum and in the eyesafe portion of the IR spectrum providing the cameras used are sensitive to this wavelength.

Laser pointers can also be modulated to permit the distance to the reflective point to be determined. This can be accomplished with pulse modulation, frequency modulation with one or more frequencies, noise or pseudo noise modulation or any other modulation which permits the distance to the point of reflection to be determined. Alternately, a distance can be determined without modulation provided the pointer is not co-located with the imager. In this case, the position on the image of the laser reflection permits the distance to the reflection point to be calculated by triangulation. By using two or more such laser pointers, the angle of a surface can also be estimated.

As the probe vehicle 16 traverses a roadway, it obtains images of the space around the vehicle and transmits these images, or information derived therefrom, to a remote station 14 off of the vehicle 16, using a transmitter or communications unit 18, which may be separate from or part of a vehicle-mounted communication unit or combined unit 100 (e.g., included in the housing). This communication using communications unit 18 can occur in any of a variety of ways including cellphone, Internet using a broadband connection, LEO or GEO satellites or other telematics communication system or method. The information can also be stored in memory on the vehicle for transmission at a later time when a connection is available. In such a case, the time that the image was acquired and information permitting the remote station 14 to determine the particular satellites is used to locate the vehicle 16.

Image acquisition by a probe vehicle 16 can be controlled by a remote site (e.g., personnel at the remote station 14) on an as-needed basis. If the remote station 14 determines that more images would be useful, for example if it indicates a change or error in the map, it can send a command to the probe vehicle 16 to upload one or more images. In this manner, the roads can be continuously monitored for changes and the maps kept continuously accurate. Similarly, once the system is largely operational, a probe vehicle 16 can be constantly comparing what it sees using the camera 10 with its copy of the map in map database 12 and when it finds a discrepancy in the presence or location of a fiduciary found in the image from camera 10 relative to the contents of the map database 12, for example, it can notify the control site and together they can determine whether the probe vehicle's map needs updating or whether more images are needed indicating a change in the roadway or its surrounding terrain.

Such probe equipment can be initially installed on government-owned vehicles or for those that are permitted access to restricted lanes or a special toll discount can be given as an incentive to those vehicle owners that have their vehicles so equipped. Eventually, as the system becomes more ubiquitous, the next phase of the system can be implemented whereby vehicles can accurately determine their location without the use of GPS by comparing the location of fiduciaries as found in their images with the location of the fiduciaries on the map database. Since GPS signals are very weak, they are easily jammed or spoofed, so having an alternative location system becomes important as autonomous vehicles become common.

Remote station 14 can create and maintain a map database from the information transmitted by the probe vehicles 16. When a section of roadway was first traversed by such a probe vehicle 16, the remote station 14 can request that a large number of images be sent from the probe vehicle 16 depending on the available bandwidth. Additional images can be requested from other probe vehicles until the remote station 14 determines that a sufficient set has been obtained. Once a sufficient number of images have been acquired of a particular fiduciary so that the desired level of position accuracy has been established, then, thereafter additional images can be requested only if an anomaly is detected or occasionally to check that nothing has changed.

Two images of a particular fiduciary (taken from different locations) are necessary to establish an estimate of the location of the fiduciary. Such an estimate contains errors in, for example, the GPS determination of the location of the device each second for calibration, errors in the IMU determination of its location over and above the GPS errors, errors in the determination of the angle of the fiduciary as determined by the IMU and the camera pixels and errors due to the resolutions of all of these devices. When a third image is available, two additional estimates are available when image 1 is compared with image 3 and image 2 is also compared with image 3. The number of estimates E available can be determined by the formula $E=n*(n-1)/2$, wherein n is the number of images. Thus the number of estimates grows rapidly with the number of images. For example, if 10 images are available, 45 estimates of the position of the fiduciary can be used. Since the number of estimates increases rapidly with the number of images, convergence to any desired accuracy level is rapid. 100 images, for example, can provide almost 5000 such estimates.

The difference between two GPS location calculations made using the same set of satellites can be used to correct the IMU in the following manner. As long as the same set of satellites are used, the influence of atmospheric distortions are eliminated when calculating the changes in positions, that is, the displacements. The displacements as determined by the GPS should be very accurate and thus can be used to compare with the displacements determined by the IMU through double integration of the accelerations. Similarly, the vector between the two GPS positions can be used to correct the IMU gyroscopes when the angular velocities are integrated once and differenced to get the change in angles which are required to conform to the vector. The angular corrections can be further checked if the IMU contains a magnetometer and the earth's magnetic field is known at the location.

An important part of this process is in determining the fiduciaries. Generally, a fiduciary, as used herein, is any object which is easily observable, has a largely invariant shape when viewed from different locations and does not move. Light poles, any vertical lines on a manmade structure such as a sign or building, would all be good choices. A rock is easily observable and does not move but it may have a different profile when viewed from nearby points and so it may be difficult to find a point of the rock which is the same in multiple images and so such a rock may not be a good fiduciary. In some locations, there may not be any natural objects which qualify as fiduciaries such as when driving close to the ocean or a field of wheat. If the road is paved, then the edges of the pavement may qualify so long as there is a visual mark in the pavement which is permanent and observable from several locations. An unpaved road may not have any permanent observables although the smoothed road edge can be used in some cases. To solve these issues, artificial fiduciaries, such as distance markers, may be necessary.

It is known that if a GPS receiver, receiver F, is placed at a fixed location that, with appropriate software, it can eventually accurately determine its location without the need for a survey. Even within less than an hour in a good GPS reception area, the receiver can have an estimate of its location within centimeters. It accomplishes this by taking a multitude of GPS data as the GPS satellites move across the sky and applying appropriate algorithms that are known in the art. Here, this concept is extended to where the GPS readings are acquired by multiple probe vehicles at various times of the day and under varying atmospheric (ionospheric) conditions. These vehicles also can record locations of objects in the infrastructure surrounding each vehicle, the fiduciaries, increasing the completeness and detail of the map database and recording changes in the presence and positions of such objects. For example, as a probe vehicle traverses a roadway, it can determine the location of a lamp pole, for example, on the left side of the vehicle and perhaps another fixed object on the right side of the vehicle, although this is not necessary. It also records the GPS readings taken at the moment that the images of the light pole were taken. The probe vehicle 16 can transmit, using its communications unit 18, to the remote station 14, the vectors to the fiduciaries along with the vehicle position and orientation based on the GPS-corrected IMU. Thus, the remote station 14 can obtain an estimate of the direction of the lamppost from the vehicle 16 and with two such estimates can make an estimation of the location of the lamppost. In a similar manner, therefore, as with the receiver F example, the position estimate improves over time as more and more such data is received from more and more probe vehicles using data taken at different times, from different locations and with different GPS, Galileo and/or Glonass or equivalent GNSS satellites at different locations in the sky and under different ionospheric conditions.

Distances to objects need not be actually measured since as the vehicle moves and its displacement between images and orientation or pointing direction of each camera 10 when each image is obtained is known, the distances to various objects in the images can be calculated using trigonometry in a manner similar to distances determined from stereo photography. Some of these distance calculations can be made on the probe vehicle 16 to permit anomaly and map error detection locally, whereas detailed calculations are better made (additionally or alternatively) at the remote station 14 which would have greater processing power and data from more image observations of a particular fiduciary. Particular objects in an image can be considered as fiducial points and geo-tagged in the map database to aid the probe vehicles 16 in determining their location and to determine changes or errors in the map database 12. Thus, the location of many items fixed in the infrastructure can be determined and their location accuracy continuously improved as more and more probe data is accumulated.

Technicians and/or computer programs at the remote station 14 or elsewhere can then begin to construct an accurate map of the entire roadway by determining the location of the road edges and other features and objects that were not actually measured by estimating such coordinates from the images sent by the probe vehicles 16. The probe vehicles 16 can compare their ongoing measurements with the current map database 12, using the geo-tagged fiducial points for example, and when an anomaly is discovered, the remote station 14 can be informed and new images and/or measurements can be uploaded to the remote station 14. Other map features that can be desirable in such a map database 12 such as the character of the shoulder and the ground beyond the shoulder, the existence of drop-offs or cliffs, traffic signs including their text and traffic control devices, etc. can also be manually or automatically added to the database as needed to complete the effort.

By this method, an accurate map database 12 can be created and continuously verified through the use of probe vehicles 16 and a remote station 14 that creates and updates the map database 12.

Although several approaches have been discussed above this invention is not limited thereby and other methods should now be apparent to those skilled in the art in view of the disclosure herein. These include the use of a structured light pattern projected onto the infrastructure, usually from a position displaced from the imager position, in addition to or in place of the laser pointers discussed above, among others. If the size and/or position in the image of a reflected pattern vary with distance, then this can provide a method of determining the distance from the probe vehicle to one or more objects or surfaces in the infrastructure through stereographic techniques from multiple images and knowledge of the vehicle's displacements between images and orientation at each image. This is especially useful if the location of the illumination light source is displaced axially, laterally or vertically from the imager. One particularly useful method is to project the structured image so that it has a focal point in front of the imager and thus the image reflected from the infrastructure has a size on the image that varies based on distance from the imager.

When processing information from multiple images at the remote station 14, data derived from the images is converted to a map including objects from the images by identifying common objects in the images and using the satellite position information from when the images were obtained to place the objects in the map. The images may be obtained from the same probe vehicle 16, taken at different times and including the same, common object, or from two or more probe vehicles 16 and again, including the same, common object. By using a processor at the remote station 14 that is off of the probe vehicles 16, yet in communication with all of the probe vehicles 16 via communication unit 18, images from multiple vehicles or the same vehicle taken at different times may be used to form the map. In addition, by putting the processor off of the probe vehicles 16, it is possible to make DGPS corrections without having equipment to enable such corrections on the probe vehicles 18.

GPS-based position calculations on a stationary probe vehicle 16 ought to yield the same results as long as the same satellites are used. If a different satellite is used, then a jump in the position can be expected. Thus, GPS can be used to correct the IMU as long as the satellites do not change in the location calculations. When differential corrections are used, they are done on a satellite-by-satellite basis and therefore the vehicle must know which satellites are being used in the calculation. If these corrections are done at the remote station 14 separate and apart from the vehicles, then the vehicles 16 must send that information to the remote station 14 where the differential corrections are known. Alternatively, the differential corrections for all satellites can be sent to the vehicle 16 and the corrections made on the vehicle 16.

As the vehicle 16 moves, the uncorrected GPS position calculations can be compared to the position calculations made by the IMU 8 after the IMU 8 has been corrected based on consecutive GPS readings providing the same satellites area used. In the same way that a receiver F placed on the ground gradually eliminates the GPS errors, a moving receiver can also be capable of this process and therefore a properly constructed algorithm can result in the vehicle position being determinable with high accuracy even though it is moving. Such a procedure can be as follows:

1. Make an initial calculation of the vehicle base position, P0, using uncorrected GPS signals.
2. Make a second vehicle position calculation after the vehicle has moved using the same satellites, P1.
3. Compare the GPS determined changes with the IMU determined changes and correct the IMU.
4. Continue this process as long as the satellites used do not change.
5. When the satellites being used change, use the new position calculation Pn' based on the new satellites to change the value of Pn by combining by an appropriate method (which would be known or can be determined by one skilled in the art in view of the disclosure herein) the new position Pn' with the old position Pn which has been determined from the IMU and Pn-1. Then use this as the new base position.
6. By using the proper combining algorithm, the base position of the vehicle should converge to the real position to any degree of accuracy desired.

By using this process, an accurate map database 12 can automatically be constructed based on accurate vehicle positions and continuously verified without the need for special mapping vehicles containing expensive position determining apparatus.

Other map information can be incorporated in the map database 12 at the remote station 14 such as the locations, names and descriptions of natural and manmade structures, landmarks, points of interest, commercial enterprises (e.g., gas stations, libraries, restaurants, etc.) along the roadway since their locations can have been recorded by the probe vehicles 16. Once a map database 12 has been constructed using more limited data from a mapping vehicle, for example, additional data can be added using data from probe vehicles 16 that have been designed to obtain different data than the initial probe vehicles 16 have obtained thereby providing a continuous enrichment and improvement of the map database 12. Additionally, the names of streets or roadways, towns, counties, or any other such location based names and other information can be made part of the map. Changes in the roadway location due to construction, landslides, accidents etc. can now be automatically determined by the probe vehicles. These changes can be rapidly incorporated into the map database 12 and transmitted to vehicles on the roadway as map updates. These updates can be transmitted by means of cell phone towers, a ubiquitous Internet or by any other appropriate telematics method.

The probe vehicles 16 can transmit pictures or images, or data derived therefrom, from vehicle-mounted cameras along with its GPS and IMU derived coordinates. Differential corrections, for example, can be used at the remote station 14 and need not be considered in the probe vehicles 16 thus removing the calculation and telematics load from the probe vehicle 16. See, for example, U.S. Pat. No. 6,243,648 and similar techniques described in the patents assigned to the current assignee. The remote station 14, for example, can know the DGPS corrections for the approximate location of the vehicle at the time that the images or GPS readings were acquired. Over time the remote station 14 would know the exact locations of infrastructure resident features such as the lamppost discussed above in a manner similar to receiver F discussed above.

In this implementation, the remote station 14 would know the mounting locations of the vehicle-mounted camera(s) 10, the GPS receivers 6 and IMU 8 on the vehicle 16 and their positions and orientations relative to one another, the view angles of the vehicle-mounted cameras 10 and its DGPS corrected position which should be accurate within 10 cm or less, one sigma. By monitoring the movement of the vehicle 16 and the relative positions of objects in successive pictures from a given probe vehicle 16 and from different probe vehicles, an accurate three dimensional representation of the scene can be developed over time even without any laser based actual distance measurements. Of course, to the extent that other information can be made available, the map can be more rapidly improved. Such information can come from other sensors such as laser radar, range gating, radar or other ranging or distance measurement devices or systems. Images from one or more probe vehicles 16 can be combined using appropriate software to help create the three-dimensional representation of the scene.

Another aspect of this technique is based on the fact that much in the infrastructure is invariant and thus once it is accurately mapped, a vehicle with one or more mounted cameras and/or range determining devices (range meters) can accurately determine its position without the aid of GPS. In the camera case, the vehicle can contain software that can align a recently acquired image with one from the map database and from the alignment process accurately determine its location.

For example, the vehicle resident map can tell the vehicle that based on its stated location, it should find a fiduciary imaged on certain pixels of its imager. If instead that fiduciary is found at a slightly different location based on image analysis, then the base position can be corrected. When there are two such discrepancies, then the IMU can be corrected. In this manner, the map can be used to accurately locate the vehicle and one or more images used to correct its base position and its IMU calibration. This can be done at whatever frequency is necessary to maintain the vehicle 16 at a high accuracy state. Such a system eliminates the necessity for GPS and thus protects against a GPS outage or spoofing.

Map improvements can include the presence and locations of points of interest and commercial establishments providing location-based services. Such commercial locations can pay to have an enhanced representation of their presence along with advertisements and additional information which may be of interest to a driver. This additional information could include the hours of operation, gas price, special promotions etc. Again, the location of the commercial establishment can be obtained from special vehicles which can specialize in identifying commercial establishments or the probe vehicles 16. The commercial establishment can pay to add additional information to the database 12.

An important part of some embodiments of the invention is the digital map that contains relevant information relating to the road on which the vehicle is traveling. The digital map, which should conform to GIS standards, usually includes the location of the edge of the road, the edge of the shoulder, the elevation and surface shape of the road, the character of the land beyond the road, trees, poles, guard rails, signs, lane markers, speed limits, etc. some of which are discussed elsewhere herein.

Examples of flow charts, logic diagrams and connections to the various components to the system are described in the above referenced patents and published patent applications and is not reproduced here.

Map database 12 can be of any desired structure or architecture. Preferred examples of the database structure are of the type discussed in U.S. Pat. No. 6,144,338 (Davies) and U.S. Pat. No. 6,247,019 (Davies).

Cameras 10 used can be ordinary color still or video cameras, high-speed video cameras, wide angle or telescopic cameras, black and white video cameras, infrared cameras, etc. or combinations thereof. In some cases, special filters are used to accentuate certain features. For example, it has been found that lane markers frequently are more readily observable at particular frequencies, such as infrared. In such cases, filters can be used in front of the camera lens or elsewhere in the optical path to block unwanted frequencies and pass desirable frequencies. Using a camera constructed to be sensitive to infrared in conjunction with general IR illumination can, by itself, improve lane absorbability either with or without special filters. Polarizing lenses have also been found to be useful in many cases. Natural illumination can be used in the mapping process, but for some particular cases, particularly in tunnels, artificial illumination can also be used in the form of a floodlight or spotlight that can be at any appropriate frequency of the ultraviolet, visual and infrared portions of the electromagnetic spectrum or across many frequencies with IR being a preferred illumination, when illumination is desired, especially when the vehicle is operating while the road is in use by others.

Laser scanners can also be used for some particular cases when it is desirable to illuminate some part of the scene with a bright spot. In some cases, a scanning laser rangemeter can be used in conjunction with the forward-looking cameras to determine the distance to particular objects in the camera view. The scanning laser rangemeter determines distance to a reflection point by time of flight or phase comparisons of a modulated beam between the transmitted and received signals. Range gating can also be used especially in poor visibility conditions to allow an image to be capture of a particular slice in space at a particular distance from the camera. If the camera is outside of the vehicle passenger compartment, the lens can be treated with a coating which repels water or resists adherence of dirt or other contaminants which may obscure the view through the lens as is known to those skilled in the art.

Finally, not all probe vehicles 16 need be identical since different camera systems highlight different aspects of the environment to be mapped.

During the map creation it may be desirable to include other information such as the location of all businesses of interest to a traveler such as gas stations, restaurants etc., which could be done on a subscription basis or based on advertising which can yield an additional revenue source for the map providing institution or company.

Another important aid as part of some of the inventions disclosed herein is to provide markers along the side(s) of roadways which can be either visual, passive or active transponders, reflectors, or a variety of other technologies including objects that are indigenous to or near the roadway, which have the property that as a vehicle passes the marker, it can determine the identity of the marker and from a database, it can determine the exact location of the marker. The term "marker" is meant in the most general sense. The signature determined by a continuous scan of the environment, for example, would be a marker if it is relatively invariant over time such as, for example, buildings in a city. Basically, there is a lot of invariant information in the environment surrounding a vehicle as it travels down a road toward its destination.

For the case of specific markers placed on the infrastructure, if three or more of such markers are placed along a side of the roadway, a passing vehicle can determine its exact location by triangulation.

Although the system is illustrated for use with automobiles, the same system would apply for all vehicles including trucks, trains an even airplanes taxiing on runways. It also can be useful for use with cellular phones and other devices carried by humans.

While the invention has been illustrated and described in detail in the drawings here and in the referenced related patents and patent applications and the foregoing description, the same is to be considered as illustrative and not restrictive in character, it being understood that only preferred embodiments have been shown and described and that all changes and modifications that come within the spirit of the invention are desired to be protected.

This application is one in a series of applications covering safety and other systems for vehicles and other uses. The disclosure herein goes beyond that needed to support the claims of the particular invention that is claimed herein. This is not to be construed that the inventors are thereby releasing the unclaimed disclosure and subject matter into the public domain. Rather, it is intended that patent applications have been or will be filed to cover all of the subject matter disclosed above.

The invention claimed is:

1. A vehicle-mounted device, comprising:
    an inertial measurement unit (IMU) comprising six acceleration or velocity measuring devices;
    a receiver configured to receive satellite-sourced positioning signals;
    at least one camera each positioned to obtain images of an area exterior of the vehicle;
    a control system coupled to said IMU, said receiver and said at least one camera, said control system being configured to re-calibrate said six acceleration or velocity measuring devices using signals obtained by said receiver; and
    a communication system coupled to said control system and that communicates the images obtained by said at least one camera or information about objects in the images obtained by said at least one camera to a location separate and apart from the vehicle,
    wherein said control system includes a processor and is configured to provide a location of said at least one camera based on data from said IMU corrected based on data from said receiver and positioning correction data derived from satellite-sourced positioning signals and to provide a direction in which said at least one camera is imaging based on data from said IMU corrected based on data from said receiver.

2. The device of claim 1, wherein said IMU is manufactured using mass-production MEMS technology.

3. The device of claim 1, wherein said control system is further configured to re-calibrate said six acceleration or velocity measuring devices using a zero lateral and vertical speed of the vehicle and speedometer readings of the vehicle.

4. The device of claim 1, wherein said six acceleration or velocity measuring devices comprise three accelerometers that measure acceleration in a respective direction in a three-dimensional coordinate system and three gyroscopes that measure angular velocity about a respective axis in the three-dimensional coordinate system, said control system is further configured to correct projections of gravitational acceleration in readings from said three accelerometers, when the vehicle tilts, and projections of centrifugal accelerations in readings from said three gyroscopes during turning maneuvers.

5. The device of claim 1, wherein said IMU, said receiver, and said at least one camera are mounted in a single housing, said housing being positioned on the vehicle such that said at least one camera images a portion of a road in front of the vehicle and terrain on both sides of the vehicle, said at least one camera having a horizontal field of view of from about 45 to about 180 degrees.

6. The device of claim 1, further comprising a speed limiting apparatus that notifies a driver of the vehicle of a maximum speed of travel of the vehicle or automatically limits speed of the vehicle to the maximum speed of travel of the vehicle at the location at which the vehicle is travelling, said control system being coupled to said speed limiting apparatus and generating the maximum speed of travel of the vehicle based on speed and accuracy of processing of images obtained by said at least one camera by said control system.

7. The device of claim 1, further comprising a map database resident on the vehicle, said map database including location of objects in the images obtained by said at least one camera.

8. The device of claim 7, wherein said control system is further configured to identify objects in images obtained by said at least one camera and determine their location and to determine whether the identified objects and their location are present in said map database, said processor being configured to communicate only the images obtained by said at least one camera that include objects not present in said map database, only objects whose location in said map database is inaccurate and only information about an object derived by said control system that is not included in said map database to the location separate and apart from the vehicle.

9. The device of claim 7, wherein said control system is configured to correct data from said IMU using said map database and said at least one camera and without use of data from said receiver by comparing expected location of an object in an image obtained by said at least one camera when the vehicle is at a specific location using said map database to actual location of the same object in an image obtained by said at least one camera as determined by said processor when the vehicle is at the specific location, and correcting the data from said IMU when the actual vehicle location differs from the expected vehicle position.

10. The device of claim 7, wherein said control system is further configured to determine the location of objects in the images obtained by said at least one camera from multiple images using displacement of the vehicle between the times when the multiple images are obtained and a known orientation of said at least one camera relative to the vehicle when each of the multiple images is obtained, the determined location of the objects in the images obtained by said at least one camera being included in said map database.

11. The device of claim 7, wherein said communication system communicates location of the vehicle to the remote location, a determination being made at the remote station whether images of the area exterior of the vehicle at the vehicle's location communicated to the remote station using said communication system are needed to obtain information about objects in the area to include in said map database, and when it is determined that images of the area exterior of the vehicle at the vehicle's location are needed to obtain information about objects in the area to include in said map database, said at least one camera being configured to be directed to obtain images of the area exterior of the vehicle at the vehicle's location.

12. The device of claim 1, wherein said communication system communicates the location of the vehicle to the remote location, and said at least one camera is configured to be remotely controlled to obtain images based on its location communicated by said communication system.

13. The device of claim 1, wherein said six acceleration or velocity measuring devices comprise three accelerometers that measure acceleration in a respective direction in a three-dimensional coordinate system and three gyroscopes that measure angular velocity about a respective axis in the three-dimensional coordinate system, and said control system is further configured to compare output from said three accelerometers and said three gyroscopes with the derived location and angular orientation of the vehicle, and based on the comparison, modify acceleration output from said three accelerometers and modify angular velocity output from said three gyroscopes.

14. The device of claim 13, wherein said control system is further configured to determine location and angular orientation of the vehicle from the modified acceleration output from said three accelerometers and modified angular velocity output from said three gyroscopes, said control system being further configured to determine a direction in which said at least one camera is pointing when images are obtained by said at least one camera based on the determined angular orientation of the vehicle, and said control system deriving information about objects in the images obtained by said at least one camera and location of the objects based on the determined location of the vehicle and the determined direction in which said at least one camera is pointing when images including the objects are obtained by said at least one camera.

15. The device of claim 1, wherein said at least one camera consists of a single camera.

16. The device of claim 1, wherein said at least one camera comprises a plurality of cameras.

17. The device of claim 1, wherein said control system is further configured to identify objects in images obtained by said at least one camera and determine their location based on data from the IMU and the receiver and data about the position of each of the least one camera relative to the receiver which constitutes information about objects in the images obtained by said at least one camera, said communication system being configured to communicate the information about objects in the images derived by said control system to the location separate and apart from the vehicle, the information including a location of the objects.

18. The device of claim 1, wherein said communication system is configured to communicate the images obtained by said at least one camera, and a location of the vehicle and pointing direction of said at least one camera when each of the images was obtained by said at least one camera to the location separate and apart from the vehicle.

19. A method for mapping terrain using a vehicle, comprising:
obtaining information about objects using one or more devices each comprising an inertial measurement unit (IMU) including six acceleration or velocity measuring devices, a receiver configured to receive satellite-sourced positioning signals, at least one camera each positioned to obtain images of an area exterior of the device, and a control system coupled to the IMU, the receiver and the at least one camera;

re-calibrating the six acceleration or velocity measuring devices using signals obtained by the receiver;

communicating the images obtained by the at least one camera or the information about objects in the images obtained by the at least one camera to a location separate and apart from the vehicle using a communications system; and correcting data from the IMU using data from the receiver, using a processor of the control system, to provide a location of the at least one camera of each device when each image is obtained and a pointing direction of the at least one camera when each image is obtained, the step of correcting the data from the IMU using data from the receiver to provide a location of the at least one camera of each device when each image is obtained comprising correcting the data based on positioning correction data derived from satellite-sourced positioning signals.

20. The method of claim 19, further comprising maintaining a map database on the vehicle by adding to the map database, objects in images obtained by the at least one camera, the map database maintaining step comprising:

identifying the same object in two or more images obtained from different locations using the processor; and positioning, using the processor, the object in the map database based on the data about the locations of the at least one camera on the device from which the two or more images were obtained and the pointing direction of the at least one camera on the device when the images were obtained.

21. The method of claim 20, further comprising:

identifying objects in images obtained by the at least one camera and their location using the processor;

determining whether the identified objects are present in the map database using the processor; and controlling, using the processor, communication of the images obtained by the at least one camera or of the derived information about objects in the images from the device to the location separate and apart from the vehicle using the communications system such that images or derived information about an object is transmitted to the location separate and apart from the vehicle only when the object is not present in the map database or only when the location of the object in the map database is not accurate.

22. The method of claim 20, further comprising:

correcting, using the processor, data from the IMU using the map database and the at least one camera and without use of data from the receiver by comparing expected location of an object in an image obtained by the at least one camera when the vehicle is at a specific location known from the map database to actual location of the same object in an image obtained by the at least one camera as determined by the processor when the vehicle when at the specific location, and correcting the data from the IMU when the actual vehicle location differs from the expected vehicle location.

23. The method of claim 19, wherein the six acceleration or velocity measuring devices comprise three accelerometers that measure acceleration in a respective direction in a three-dimensional coordinate system and three gyroscopes that measure angular velocity about a respective axis in the three-dimensional coordinate system, the method further comprising:

comparing output from the three accelerometers with the derived location and angular orientation of the vehicle and based on the comparison, modifying acceleration output from the three accelerometers and modifying angular velocity output from the three gyroscopes;

determining location and angular orientation of the vehicle from the modified acceleration output from the three accelerometers and modified angular velocity output from the three gyroscopes; and determining a direction in which the at least one camera is pointing when images are obtained by the at least one camera based on the determined angular orientation of the vehicle;

information about objects in the images obtained by the at least one camera and location of the objects being derived based on the determined location of the vehicle and the determined direction in which the at least one camera is pointing when images including the objects are obtained by the at least one camera.

24. The method of claim 19, wherein each of the devices further includes an additional receiver configured to receive satellite-sourced positioning signals, the additional receiver being coupled to said control system, the six acceleration or velocity measuring devices being re-calibrated using signals obtained by the additional receiver, information about objects in the images obtained by the at least one camera and location of the objects being derived based further on data from the additional receiver and data about the position of each of the least one camera relative to the additional receiver.

25. The method of claim 19, further comprising determining location of objects in the images obtained by the at least one camera based on data from the IMU and the receiver and data about the position of each of the least one camera relative to the receiver which constitutes information about objects in the images obtained by the at least one camera, the step of communicating the images obtained by the at least one camera or information about objects in the images obtained by the at least one camera to the location separate and apart from the vehicle using the communications system comprising communicating the determined object location to the location separate and apart from the vehicle.

26. The method of claim 19, further comprising determining a location of the vehicle and pointing direction of the at least one camera when each of the images was obtained by the at least one camera, the step of communicating the images obtained by the at least one camera or information about objects in the images obtained by the at least one camera to the location separate and apart from the vehicle using the communications system comprising communicating the images obtained by the at least one camera, and the location of the vehicle and the pointing direction of the aid at least one camera when each of the images was obtained by the at least one camera to the location separate and apart from the vehicle.

27. A method for mapping terrain using vehicles, comprising:

receiving from each vehicle at a location separate and apart from the vehicles, information about objects obtained using one or more devices on each vehicle, each device comprising an inertial measurement unit (IMU) including six acceleration or velocity measuring devices, a receiver configured to receive satellite-sourced positioning signals, at least one camera each positioned to obtain images of an area exterior of the device, and a control system coupled to the IMU, the receiver and the at least one camera, the six acceleration or velocity measuring devices in each device being re-calibrated using signals obtained by the receiver in each device, information about objects in the images obtained by the at least one camera in each device being derived based on data from the IMU and the receiver and data about the position of each of the least one camera relative to the receiver, the images obtained by the at least one camera or the derived information about objects in the images obtained by the at least one camera being communicated to the location separate and apart from the vehicles using a communications system on each vehicle, the data from the IMU being corrected using data from the receiver, using a processor of the control system, to provide a location of the at least one camera of each device when each image is obtained and a pointing direction of the at least one camera when each image is obtained; and creating a map database at the remote location from the received information by adding to the map database, objects in images obtained by the at least one camera of the device in the vehicles and the location of these objects.

28. The method of claim 27, wherein the step of creating the map database further comprises:

identifying the same object in two or more images obtained from different locations using the processor; and positioning, using the processor, the object in the map database based on the data about the locations of the at least one camera on the device from which the two or more images were obtained and the pointing direction of the at least one camera on the device when the images were obtained.

* * * * *

UNITED STATES PATENT AND TRADEMARK OFFICE
CERTIFICATE OF CORRECTION

PATENT NO. : 9,528,834 B2  
APPLICATION NO. : 14/570638  
DATED : December 27, 2016  
INVENTOR(S) : David S. Breed and Ryan Breed Page 1 of 1

It is certified that error appears in the above-identified patent and that said Letters Patent is hereby corrected as shown below:

In the Claims  
Claim 19, Column 19, Line 6, before "information", delete "the".

Signed and Sealed this  
Twenty-eighth Day of February, 2017

Michelle K. Lee  
*Director of the United States Patent and Trademark Office*